United States Patent
Huang

(10) Patent No.: US 10,530,153 B2
(45) Date of Patent: Jan. 7, 2020

(54) METHOD AND APPARATUS FOR OPERATING A POWER SYSTEM ARCHITECTURE

(71) Applicant: GE AVIATION SYSTEMS, LLC, Grand Rapids, MI (US)

(72) Inventor: Hao Huang, Troy, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 268 days.

(21) Appl. No.: 15/602,904

(22) Filed: May 23, 2017

(65) Prior Publication Data

US 2018/0339790 A1    Nov. 29, 2018

(51) Int. Cl.
*B64D 41/00* (2006.01)
*H02J 3/00* (2006.01)

(52) U.S. Cl.
CPC .......... *H02J 3/006* (2013.01); *B64D 2221/00* (2013.01)

(58) Field of Classification Search
None
See application file for complete search history.

(56) References Cited

U.S. PATENT DOCUMENTS

| 5,939,800 | A | * | 8/1999 | Artinian | B64D 13/06 |
| | | | | | 244/53 R |
| 6,664,656 | B2 | | 12/2003 | Bernier | |
| 6,921,987 | B2 | | 7/2005 | Marin-Martinod | |
| 8,018,086 | B2 | * | 9/2011 | Legros | F01D 19/00 |
| | | | | | 307/10.6 |

* cited by examiner

*Primary Examiner* — Jared Fureman
*Assistant Examiner* — Aqeel H Bukhari
(74) *Attorney, Agent, or Firm* — McGarry Bair, P.C.

(57) ABSTRACT

A method and apparatus for operating a power architecture for an aircraft, includes a primary variable frequency generator system having a first power output, a secondary variable frequency generator system having a second power output, a power distribution node, an essential power bus selectively connected with a set of essential aircraft electrical loads, and a controller module.

20 Claims, 5 Drawing Sheets

METHOD AND APPARATUS FOR OPERATING A POWER SYSTEM ARCHITECTURE

BACKGROUND OF THE INVENTION

Contemporary aircraft engines include electric machines, or generator systems, which utilize a running aircraft engine in a generator mode to provide electrical energy to power systems and components on the aircraft. The power generated by the generator can be supplied to a power bus of the aircraft. The power bus, or a set of power buses, can further provide switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION OF THE INVENTION

In one aspect, the present disclosure relates to a power architecture for an aircraft, including a variable frequency primary generator system having a first power output, a variable frequency secondary generator system having a second power output, an essential power bus selectively connected with the first power output and connected with a set of essential aircraft electrical loads, a power distribution node disposed electrically between the second power output and the essential power bus and configured to selectably connect the second power output to an essential bus power output, and a controller module configured to, upon failure of the first power output, disconnect the first power output from the essential power bus and connect the essential bus power output with the essential power bus. The essential bus power output is sufficient to energize the set of essential aircraft electrical loads.

In another aspect, the present disclosure relates to a method of operating a power system architecture, including receiving, by a control module, a demand signal indicative of an emergency demand for electrical power, in response to receiving the demand signal, controlling, by the control module, a supplying of electrical power to an essential power bus from a backup generator system including a first variable frequency generator system providing a power output to a backup distribution box configured to selectively enable the power output to energize an essential bus compatible power output selectively connected with the essential power bus, and further supplying the essential bus compatible power from the essential power bus to a set of essential electrical loads of an aircraft. The supplying electrical power is proportional to the emergency demand.

DESCRIPTION OF EMBODIMENTS OF THE INVENTION

Figure 1:
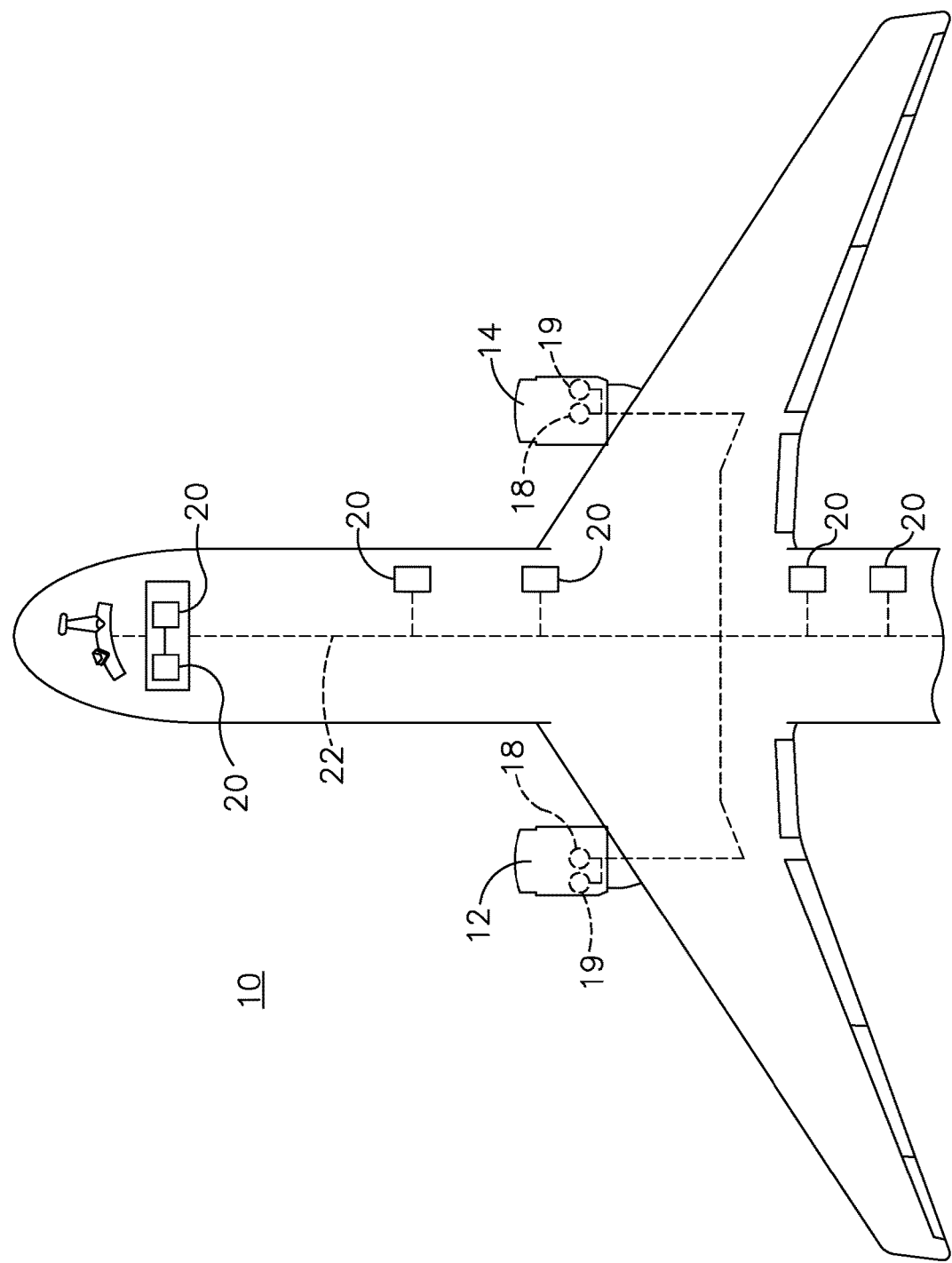
FIG. 1 is a top down schematic view of the aircraft and power system architecture of an aircraft in accordance with various aspects described herein.

Embodiments of the invention can be implemented in any environment, apparatus, or method for supplying power to a set of electrical loads connected with a power distribution architecture or system, regardless of the function performed by the power architecture. One non-limiting example environment where such a method and apparatus can be used includes, but is not limited to, a power distribution system for an aircraft. While this description is primarily directed toward a power distribution system for an aircraft, it is also applicable to any residential or commercial power architecture envisioned.

While "a set of" various elements will be described, it will be understood that "a set" can include any number of the respective elements, including only one element. The use of the terms "proximal" or "proximally," refers to a component being relatively closer to aa reference point or component, as compared to another component. As used herein, an "essential" electrical load can be a subset of one or more electrical loads of a power distribution system or architecture classified or categorized as "essential" or "critical" to the operation of the power architecture, vehicle, or another system. In one non-limiting aspect, an "essential" electrical load can be critical to flight operations of an aircraft or critical aircraft systems, and can be defined by relevant federal aircraft regulations or relevant industry standards.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, contactors, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as a first electric machine or a generator 18. The left and right engine systems 12, 14 can further include another power source, such as a second electric machine or generator 19. Non-limiting aspects of the disclosure can be included wherein, for example, the first generator 18 is a primary power source and the second generator is a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18, 19 via a power distribution system including, for instance, power transmission lines 22 or bus bars, and power distribution nodes 16. It will be understood that the illustrated embodiment of the invention of FIG. 1 is only one non-limiting example of a power distribution system, and many other possible embodiments and configurations in addition to that shown are contemplated by the present disclosure. Furthermore, the number of, and placement of, the various components depicted in FIG. 1 are also non-limiting examples of embodiments associated with the disclosure.

In the aircraft 10, the operating left and right engine systems 12, 14 provide mechanical energy which can be extracted, typically via a spool, to provide a driving force for the set of generators 18, 19. The set of generators 18, 19, in turn, generate power, such as AC or DC power, and provides the generated power to the transmission lines 22, which delivers the power to the electrical loads 20, positioned throughout the aircraft 10. In one non-limiting aspect of the disclosure, at least one of the set of generators 18, 19 can include a variable frequency generator configured or selected to generate AC power.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, generators, auxiliary power units (APUs), batteries, or the like, can be included, and can substitute for the power source.

Example power distribution management functions can include, but are not limited to, selectively enabling or disabling the delivery of power to particular electrical loads 20, by way of the operable connection, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one additional power source can be operated, enabled, or connected for providing power to the electrical loads 20. Additional management functions can be included.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

It will be understood that while one embodiment of the invention is shown in an aircraft environment, the invention is not so limited and has general application to electrical power systems in non-aircraft applications, such as other mobile applications and non-mobile industrial, commercial, and residential applications.

Figure 2:
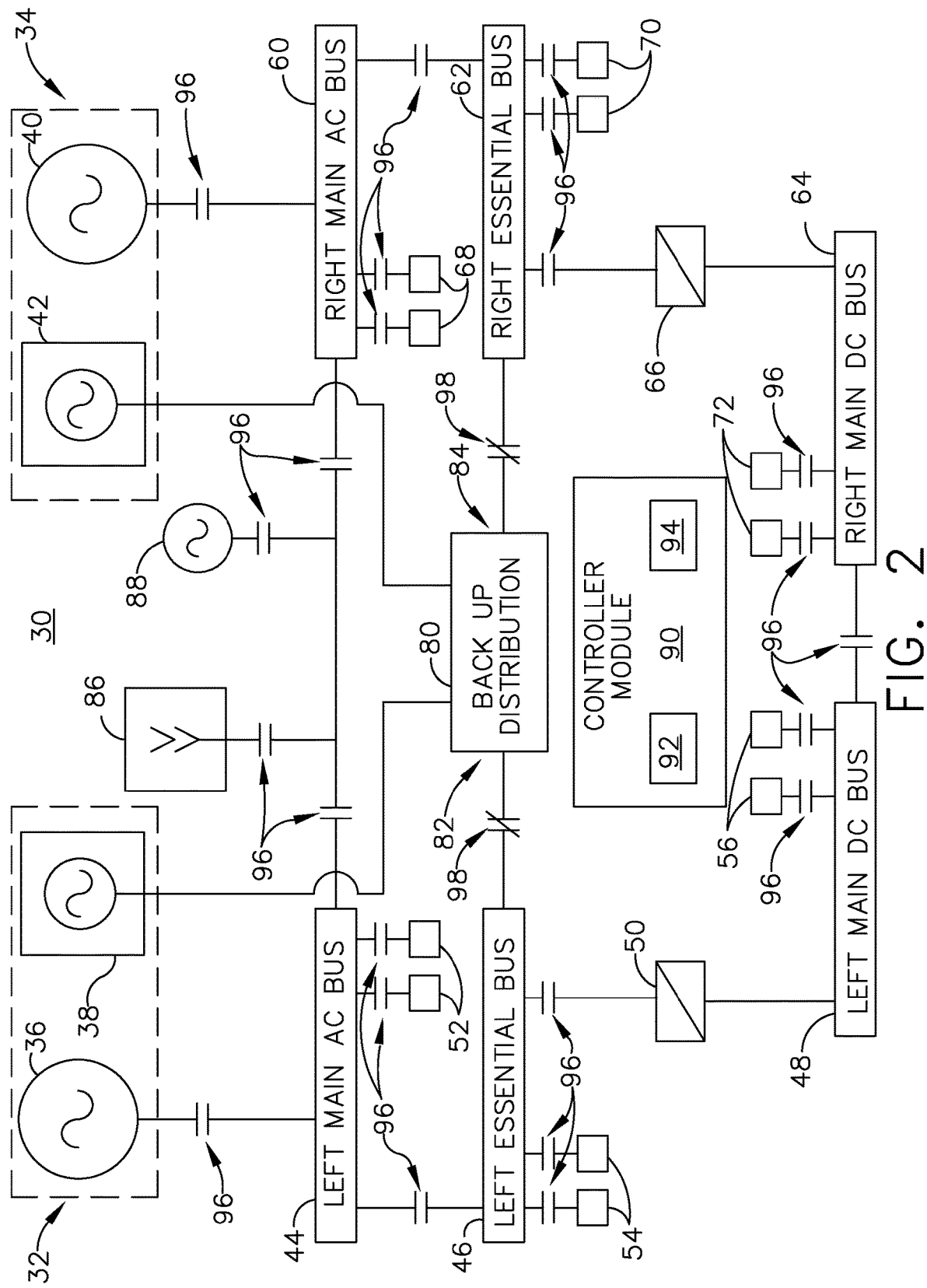
FIG. 2 is a schematic view of the power system architecture, in accordance with various aspects described herein.

FIG. 2 illustrates one non-limiting example of a power system architecture 30, in accordance with various aspects described herein. As shown, the power system architecture 30 can include a first engine system 32 and a second engine system 34. The first engine system 32 can include a first power source, such as a first electric machine or generator 36 and a second power source, such as a second electric machine or generator 38. Each of the first and second generators 36, 38 can be mechanically powered, driven, moved, rotated, or otherwise connected with the first engine system 32. Each of the first and second generators 36, 38 are variable frequency generators. Similarly, the second engine system 32 can include a third power source, such as a third electric machine or generator 40 and a fourth power source, such as a fourth electric machine or generator 42. Each of the third and fourth generators 40, 42 can be mechanically powered, driven, moved, rotated, or otherwise connected with the second engine system 34. Each of the third and fourth generators 40, 42 are variable frequency generators.

Non-limiting aspects of the disclosure can be included wherein at least one of the first or second generators 36, 38 of the first engine system 32 can be defined or selected to be a "primary" generator, while the other of the first engine system 32 generators can be defined or selected to be a "secondary" generator. For example, the first generator 36 can be a primary generator while the second generator 38 can be a secondary generator. Further non-limiting aspects of the disclosure can be included wherein at least one of the third or fourth generators 40, 42 of the second engine system 34 can be defined or selected to be a "primary" generator, while the other of the second engine system 34 generators can be defined or selected to be a "secondary" generator. For example, the third generator 40 can be a primary generator while the fourth generator 42 can be a secondary generator.

As used herein, "primary" and "secondary" can refer to an operational status or hierarchical order of power supply or generator operation or importance. For example, a "primary" generator can be the generator used most often, or under "normal" power supplying operations or operational characteristics, while a "secondary" generator can be a generator supplying supplemental, replacement, emergency, or redundant power supplying operations or operational characteristics under normal or special circumstances. Non-limiting examples of special circumstances can include transient power demands during periods of operation, the failure of a primary power supply or supplemental power supply, or the like.

The power system architecture 30 can further include a set of components "associated" with each respective engine system 32, 34. For instance, non-limiting aspects of the power system architecture 30 can include a left main AC power bus 44, a left essential power bus 46, a left main DC power bus 48, and a left transformer rectifier unit (TRU) 50. As used herein, "left" can refer to components connected with and associated with the first engine system 32 (e.g. a "left" engine system). The left main AC power bus 44 can be selectively connected with the first generator 36, with the left essential power bus 46, and with a first set of nonessential electrical loads 52. The left essential power bus 46 can be further selectively connected with the left main DC power bus 48 by way of the left TRU 50, positioned electrically between the buses 46, 48, and with a first set of essential electrical loads 54. The left main DC power bus 48 can be further selectively connected with a first set of DC electrical loads 56.

In another instance, non-limiting aspects of the power system architecture 30 can include a right main AC power bus 60, a right essential power bus 62, a right main DC power bus 64, and a right TRU 66. As used herein, "right" can refer to components connected with and associated with the second engine system 34 (e.g. a "right" engine system). The right main AC power bus 60 can be selectively connected with the third generator 40, with the right essential power bus 62, and with a second set of nonessential electrical loads 68. The right essential power bus 62 can be further selectively connected with the right main DC power bus 64 by way of the right TRU 66, positioned electrically between the buses 62, 64, and with a right set of essential electrical loads 70. The right main DC power bus 64 can be further selectively connected with a second set of DC electrical loads 72.

Additional non-limiting configurations of the power system architecture 30 can be further included. For instance, in one non-limiting aspect, the left main AC power bus 44 can be selectively connected with the right main AC power bus 60. In another non-limiting example, the left main DC power bus 48 can be selectively connected with the right main DC power bus 64. In yet another non-limiting aspect of the disclosure, the power distribution system 30 can include additional power sources, including, but limited to, at least one electrical storage device, such as a battery, an auxiliary power unit (APU) 88, a ram-air turbine system (RAT), and an external power source 86. At least a subset of the aforementioned additional power sources can be, for example, selectively connected with at least one of the left or right main AC power buses 44, 60.

Non-limiting aspects of the disclosure can also include a backup generator system, including a backup distribution box 80 selectively connected with the power output or at least one of the second generator 38 or the fourth generator 42. The backup distribution box 80 can provide or include a set of power outputs, shown as a first power output 82 and a second power output 84. The set of power outputs 82 can further be selectively connected with at least one power bus, such as the left essential power bus 46 (e.g. via the first power output 82), the right essential power bus 62 (e.g. via the second power output 84), or a combination thereof.

The power system architecture 30 can also include a controller module 90 having a processor 92 and memory 94. As described herein, the "selective connection" between respective components can be enabled or accomplished by way of a set of connectors 96, 98, which are disposed between respective components and are communicatively connected with at least one of the controller module 90 or the processor 92. The communicative connections between the set of connectors 96, 98 and the controller module 90 are not show for simplicity. As shown, a "closed" state connector is illustrated by number 96, in which the closed connector 96 is arranged, controlled, enabled, or the like to conduct power between respective components. Conversely, an "opened" state connector is illustrated by number 98, in which the opened connector 98 is arranged, controlled, disabled, or the like, such that power is not conducted between respective components.

At least one of the controller module 90 or the processor 92 can be configured to operate the set of connectors 96, 98 during power system architecture 30 operations to selectively enable or disable current paths between respective components. Non-limiting aspects of the disclosure can be included wherein, for example, the controller module 90 or the processor 92 can be configured to operate the set of connectors 96, 98 in response to a sensing or measuring of a power system architecture 30 characteristic, or in response to a signal or indicator provided by an external system.

During normal or expected operation of the power system architecture 30, the respective first engine system 32 can be mechanically powering at least the first generator 36 to generate a power output selectively connected by way of a closed connector 96 with the left main AC power bus 44. In this sense, the first generator 36 can include a variable frequency generator configured to generate an AC power output. The left main AC power bus 44 can be selectively connected by way of closed connectors 96 to provide the AC power with at least a subset of the first set of nonessential electrical loads 52 and the left essential power bus 46. The left essential power bus 46 can further be selectively connected by way of closed connectors 96 to provide the AC power with the first set of essential electrical loads 54 and with the left main DC power bus 48, by way of closed selective connectors 96 and the left TRU 50. The left TRU 50 can be configured, arranged, enabled, or the like, to convert or rectify the AC power received from the left essential power bus 46 to DC power provided to the left main DC power bus 48. The left main DC power bus 48 can further be selectively connected by way of closed connectors 96 with at least a subset of the first set of DC electrical loads 56. As described herein, aspects of the power system architecture 30 can be included wherein, for example the first generator 36 can be sized, selected, configured or the like, to sufficiently provide an expected quantity of power to energize all expected electrical loads of the "left" bus components. Further aspects can be included wherein at least one additional power source can be selectively connected by way of a closed connector 96 to supply supplemental power to energize the electrical loads of the "left" bus components.

Likewise, during normal or expected operation of the power system architecture 30, the respective second engine system 34 can be mechanically powering at least the third generator 40 to generate a power output selectively connected by way of a closed connector 96 with the right main AC power bus 60. In this sense, the third generator 40 can include a variable frequency generator configured to generate an AC power output. The right main AC power bus 60 can be selectively connected by way of closed connectors 96 to provide the AC power with at least a subset of the second set of nonessential electrical loads 68 and the right essential power bus 62. The right essential power bus 62 can further be selectively connected by way of closed connectors 96 to provide the AC power with the second set of essential electrical loads 70 and with the right main DC power bus 64, by way of closed selective connectors 96 and the right TRU 66. The right TRU 66 can be configured, arranged, enabled, or the like, to convert or rectify the AC power received from the right essential power bus 62 to DC power provided to the right main DC power bus 64. The right main DC power bus 64 can further be selectively connected by way of closed connectors 96 with at least a subset of the second set of DC electrical loads 72. As described herein, aspects of the power system architecture 30 can be included wherein, for example the third generator 40 can be sized, selected, configured or the like, to sufficiently provide an expected quantity of power energize the expected electrical loads of the "right" bus components. Further aspects can be included wherein at least one additional power source can be selectively connected by way of a closed connector 96 to supply supplemental power to energize the electrical loads of the "right" bus components.

During the aforementioned normal or expected operation, non-limiting aspects of the disclosure can be included wherein, for instance, the second and fourth generators 38, 42 are either not selectively connected with the backup distribution box 80 (e.g. open connectors 98), or the backup distribution box 80 power outputs 82, 84 are not selectively connected with the respective essential power buses 46, 62. In this sense, at least one of the second or fourth generators 38, 42 can be generating a secondary power output that is not connected with a power bus. Non-limiting aspects of the disclosure can be included wherein at least one of the second or fourth generators 38, 42 do not generate a secondary power output when the respective generator 38, 42 is not selectively connected, or selectively disconnected, from a power bus.

Figure 3:
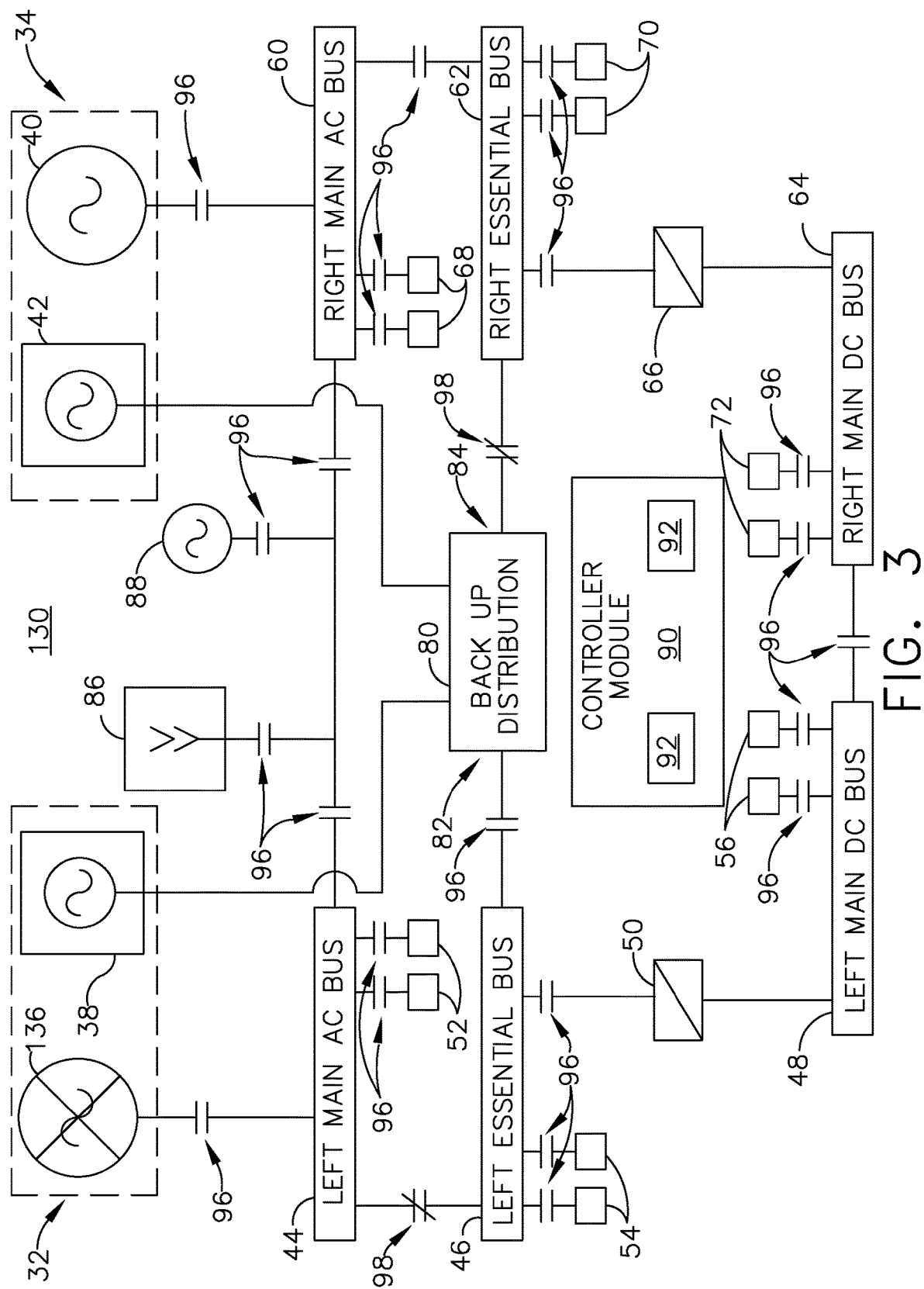
FIG. 3 is a schematic view of the power system architecture of FIG. 2, wherein a primary generator system has failed, in accordance with various aspects described herein.

FIG. 3 illustrates another power system architecture 130 according to another aspect of the present disclosure. The power system architecture 130 is similar to the power system architecture 30; therefore, like parts will be identified with like numerals increased by 100, with it being understood that the description of the like parts of the power system architecture 30 applies to the power system architecture 130, unless otherwise noted. One difference is that a primary generator, illustrated as the first generator 136 of the first engine system 32 has stopped providing a power output to the power system architecture 130. In one non-limiting example, the first generator 136 may have failed, or otherwise ceased power generation operations. The loss of the first generator 136 can result in a deficient quantity of power demanded or needed to operate the "left" components described above. In the illustrated example, the power system architecture 130, the controller module 90, or the processor 92 can, in response to the deficient quantity of power demanded, selectively disconnect the left main AC power bus 44 from the left essential power bus 46 by way of the opened connector 98, and can selectively connect the left essential power bus 46 with the first output 82 of the backup distribution box 80 by way of a closed connector 96. In one aspect, the power demanded can include a demand for emergency power.

In this sense, the power system architecture 130 selectively disconnects the non-operational first or primary generator 136, and selectively connects the second or secondary generator 38 with the left essential power bus 46. The operational second generator 38 thus supplies a power output, such as a variable frequency AC power output, to the backup distribution box 80, which selectively enables, connects, energizes, or the like, the power received to the AC power output 82 connected with the left essential power bus 46. In one non-limiting example, the backup distribution box 80 can include a set of contactors operable in response to the controller module 90. The left essential power bus 46 can then continue to supply power to the first set of essential electrical loads 54, despite the loss of the first generator 36 power supply. In this sense, the second generator 38 can be sized, selected, configured, or the like, to sufficient provide at least an expected quantity of power to energize the first set of essential electrical loads 54 of the left essential power bus 46.

Aspects of the disclosure can be included wherein the left essential power bus 46 requires or expects a set of predetermined power demand or "compatible" power characteristics. Thus, non-limiting aspects of the secondary generator can be configured to generate the variable frequency AC power output compatible with, or meeting the predetermined power demand characteristics of, the essential power bus 46. Further aspects of the disclosure can be included wherein, upon failure of the primary or first generator 36, the left TRU 50 or the left main DC power bus 48 can be selectively disconnected, by way of an opened connector 98, from the left essential power bus 46.

While the first generator 136 has been illustrated as the non-operational generator in the example, non-limiting aspects of the disclosure can be included wherein at least one of the second or fourth generators 38, 42 is selectively connected, enabled, or the like, to provide replacement or supplementary power to the power system architecture 130 upon the failure of any primary or supplemental power source or system, including but not limited to, the first generator 136, the third generator 40, the external power source 86, the APU 88, or the like. In such instance, the failure of the power source will result in that failed power source being selectively disconnected form the power system architecture 130 by way of opened connectors 98, and the connecting of at least one of the secondary generators 38, 42 with a respective essential power bus 46, 62.

Furthermore, aspects of the power system architecture 130 are envisioned wherein, for example, the fourth generator 42 is selectively connected with the left essential power bus 46, in response to the failure of the first generator 136 or another power source. In this sense, the opposing engine system 32, 34 can selectively provide secondary power to the power bus associated with failed generator. In yet another non-limiting aspect of the disclosure, both the second and fourth generators 38, 42 can simultaneously provide secondary power to each respective essential power buses in response to a demand for power, failure of one or more primary generators, or the like, as described herein. For example, during simultaneous powering, the second generator 38 can power the left essential bus 46 or the right essential bus 62, and the fourth generator 42 can power the opposing right or left essential bus 62, 46. Any number of permutations are envisioned.

In one non-limiting aspect of the disclosure, the power system architecture 130 can be configured such that the powering of the essential electrical loads by a secondary generator can be included for a predetermined period of time. In another non-limiting example, the predetermined period of time can standardized or defined by a relevant certification or certifying body. One such predetermined period of time is standardized, or defined by a relevant certification or certifying body can include extended operations (ETOPS) certification, defined and issued by the international civil aviation organization (ICAO). In one non-limiting example, an aircraft can be certified for 180 minutes, which means the aircraft is permitted to fly a flight route not more than 180 minutes of single-engine flying time to the nearest suitable airport. In this sense, upon failure of the first generator 136 or the first engine system 32, the power system architecture 130 described herein, can supply supplementary or replacement power by way of the secondary generator, such as the fourth generator 42, via the backup distribution generator system, such that the essential electrical loads can remain powered for at least 180 minutes of ongoing flight. Additional certifications or standards can be utilized to define total electrical power capacity of the power system architecture 30, 130.

Figure 4:
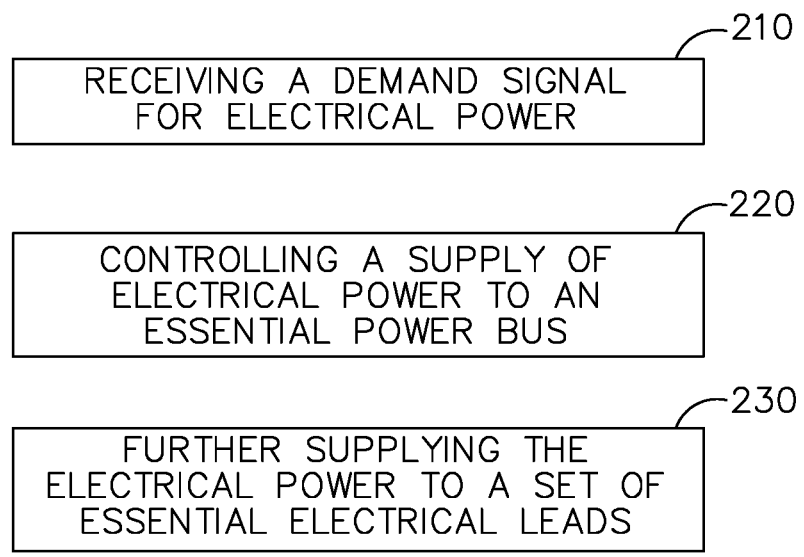
FIG. 4 is an example a flow chart diagram of demonstrating a method of operating the power system architecture of FIG. 2, in accordance with various aspects described herein.

FIG. 4 illustrates a flow chart demonstrating a method 200 of operating a power system architecture 30, 130. The method 200 begins by receiving, by a control module 90, a demand signal indicative of an emergency demand for electrical power, such as upon the failure of a primary generator or another auxiliary power source, at 210. In response to receiving the demand signal, the method 200 continues by controlling, by the control module 90, a supplying of electrical power from a secondary generator or power source to an essential power bus 46, 62 from a backup generator system including a first generator system such as the second or fourth generator 38, 42, at 220. The power supplied by the second or fourth generator 38, 42 is provided to a backup distribution box 80 configured to selectively connect the power output to an essential bus compatible power output 82, 84 selectively connected, by way of a closed connector 96, with the respective essential power bus 46, 62. The method 200 continues by further supplying the essential bus compatible power from the essential power bus 46, 62 to a set of essential electrical loads 54, 70 of an aircraft.

Non-limiting aspects of the disclosure can be included wherein the supplying the electrical power is proportional to the emergency demand. Additionally, non-limiting aspects of the disclosure can be included wherein the demand signal indicative of an emergency demand for power is triggered by the failure of a primary generator system supplying power to the essential power bus 46, 62, or wherein the triggering by the failure of the primary generator system includes at least one of a failure of a variable frequency generator system mechanically powered by an aircraft engine or an auxiliary power unit 88 generator system.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

Figure 5:
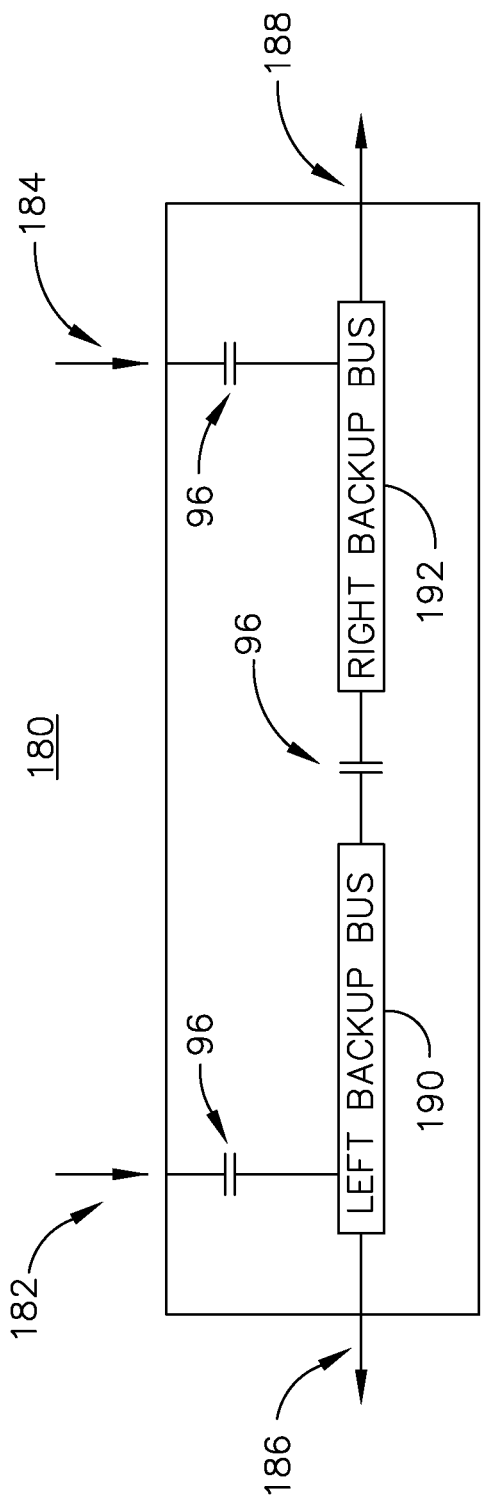
FIG. 5 is a schematic view of a backup distribution box of FIG. 2, in accordance with various aspects described herein.

FIG. 5 illustrates one non-limiting schematic view of a backup distribution box 180 in accordance with the disclosure. As shown, the backup distribution box 180 can receive a first input 182, for example from the second generator 38, a second input 184, for example from the fourth generator 42, and a first output 186 selectably connected with the left essential power bus 46, and a second output 188 selectably connected with the right essential power bus 62. In another non-limiting aspect, the backup distribution box can include a left backup bus 190 selectably connected with the first input 182 and the first output 186, and a right backup bus 192 selectably connected with the second input 184 and the second output 188. The left backup bus 190 and the right backup bus 192 can further be selectably connected to one other. As shown, aspects of the disclosure can include a set of connectors 96, 98, allowing the selectable connecting described herein. Non-limiting aspects can be including wherein the previously described controller module 90 controllably operate the set of connectors 96, 98, or wherein the set of connectors 96, 98 are operated by another controller.

Many other possible embodiments and configurations in addition to that shown in the above figures are contemplated by the present disclosure.

The embodiments disclosed herein provide an apparatus and method of operating a power system architecture enabled to provide a back-up or redundant power supply in the event of failure of a primary power supply. The technical effect is that the above described embodiments enable the operating of the power system architecture as well as the selective enabling or conducting, or disabling or disconnecting various power supplies from various power buses, including essential power buses for an aircraft. One advantage that can be realized in the above embodiments is that the above described embodiments provide a robust power system architecture enabled to allow redundant, replacement, or supplemental power to be supplied to various power buses of an aircraft, in the event of failure of a primary power supply. Yet another advantage of the above mentioned embodiments is that the selective coupling between the components, such as the AC power buses, DC power buses, and bi-directional converters, provides for a highly redundant electrical system architecture during normal and emergency operations Another advantage of the above aspects of the disclosure is that the above described configuration provides for an aircraft compatible or certified for ETOPS beyond 180 minutes by providing an independent electrical power source other than the two main generators and APU. Yet another advantage of the above aspects of the disclosure is that the configuration can also save hundreds of pounds of aircraft weight by eliminating the AC to AC power conversions for both the main variable frequency generator and the backup generator system. When designing aircraft components, important factors to address are size, weight, and reliability. The above described electrical starting system has a decreased number of parts, yet provides redundant starting operation, making the complete system inherently more reliable. This results in a lower weight, smaller sized, and increased reliability system. The lower number of parts and reduced maintenance will lead to lower product costs and lower operating costs. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power architecture for an aircraft, comprising:
   a variable frequency primary generator system having a first power output;
   a variable frequency secondary generator system having a second power output;
   an essential power bus selectively connected with the first power output and connected with a set of essential aircraft electrical loads;
   a power distribution node disposed electrically between the second power output and the essential power bus and configured to selectably connect the second power output to an essential bus power output; and
   a controller module configured to, upon failure of the first power output, disconnect the first power output from the essential power bus and connect the essential bus power output with the essential power bus;
   wherein the essential bus power output is sufficient to energize the set of essential aircraft electrical loads.

2. The power architecture of claim 1 wherein at least one of the first power output, the second power output, or the essential bus power output is an alternating current (AC) power output.

3. The power architecture of claim 2 wherein the first power output, the second power output, and the essential bus power output are alternating current (AC) power outputs.

4. The power architecture of claim 1 wherein the power distribution node includes a set of contactors operable in response to the controller module.

5. The power architecture of claim 1 wherein the essential power bus has a set of predetermined power demand characteristics.

6. The power architecture of claim 1 wherein the set of essential aircraft electrical loads are essential to the operation of the aircraft, compared with a set of non-essential aircraft electrical loads.

7. The power architecture of claim 1 wherein the primary generator system is mechanically connected with an aircraft engine.

8. The power architecture of claim 1, further comprising a first aircraft engine system connected with the primary generator system and the secondary generator system, and a second aircraft engine system connected with a second variable frequency primary generator system and a second variable frequency secondary generator system.

9. The power architecture of claim 8 wherein the second secondary generator system includes a third power output connected with the distribution node, and wherein the power distribution node is further configured to selectably connect the third power output to the essential bus power output.

10. The power architecture of claim 9 wherein the power distribution node includes a second essential power output configured to selectably connect with a second essential power bus, and wherein the controller module is configured to, upon failure of the primary generator system and the second secondary generator system, connect the second power output to the essential bus power output to energize the essential power bus and connect the third power output to the second essential power output to energize the second essential power bus simultaneously.

11. The power architecture of claim 9 wherein, upon failure of the first power output, the essential bus power output can supply a sufficient amount of power to the essential aircraft electrical loads for at least 180 minutes.

12. A method of operating a power system architecture, comprising:
    receiving, by a control module, a demand signal indicative of an emergency demand for electrical power;
    in response to receiving the demand signal, controlling, by the control module, a supplying of electrical power to an essential power bus from a backup generator system including a first variable frequency generator system providing a power output to a backup distribution box configured to selectively enable the power output to energize an essential bus compatible power output selectively connected with the essential power bus; and
    further supplying the essential bus compatible power from the essential power bus to a set of essential electrical loads of an aircraft;
    wherein the supplying electrical power is proportional to the emergency demand.

13. The method of claim 12 wherein the first variable frequency generator system provides an alternating current (AC) power output.

14. The method of claim 12 wherein the demand signal indicative of an emergency demand for power is triggered by the failure of a variable frequency primary generator system supplying power to the essential power bus.

15. The method of claim 14 wherein the triggering by the failure of the primary generator system includes a variable frequency generator system mechanically powered by an aircraft engine.

16. The method of claim 15 wherein the variable frequency generator system and the backup generator system are mechanically powered by the aircraft engine.

17. The method of claim 16 wherein the supplying of electrical power to the essential power bus from the backup generator system powers the essential electrical loads of the aircraft for at least 180 minutes.

18. The method of claim 16 wherein in response to receiving the demand signal, controlling, by the control module, a supplying of electrical power from a second variable frequency generator system mechanically powered by a second aircraft engine to the backup distribution box.

19. The method of claim 12 wherein the essential power bus is at least one of a first essential power bus associated with a first engine system or a second essential power bus associated with a second engine system.

20. The method of claim 12 wherein the generator system is an auxiliary power unit generator providing the power output.

* * * * *